United States Patent [19]

Takahashi

[11] Patent Number: 4,672,485
[45] Date of Patent: Jun. 9, 1987

[54] SEPARATELY PIVOTED HOOK ARM ARRANGEMENT FOR A CASSETTE LOADING AND UNLOADING DEVICE

[75] Inventor: Shokichi Takahashi, Tokyo, Japan

[73] Assignee: Matsushita Electric Industrial Co., Ltd., Osaka, Japan

[21] Appl. No.: 590,846

[22] Filed: Mar. 19, 1984

[30] Foreign Application Priority Data

| Mar. 18, 1983 [JP] | Japan | 58-46254 |
| Mar. 18, 1983 [JP] | Japan | 58-46255 |
| Mar. 18, 1983 [JP] | Japan | 58-46256 |

[51] Int. Cl.⁴ .............. G11B 5/008; G11B 15/00; G11B 17/00; G03B 1/04
[52] U.S. Cl. .................. 360/96.5; 360/93; 360/96.6; 360/90; 242/198
[58] Field of Search .......... 360/96.5, 96.2, 96.6, 360/90, 93, 137; 242/198

[56] References Cited

U.S. PATENT DOCUMENTS

| 3,146,316 | 8/1964 | Knoth | 360/96.3 |
| 3,747,941 | 7/1973 | Van der Lely | 360/96.5 |
| 3,820,158 | 6/1974 | Schober | 360/96.6 |
| 3,849,799 | 11/1974 | Nakamichi | 360/96.6 |
| 3,867,722 | 2/1975 | Syohji | 360/96.6 |
| 3,870,247 | 3/1975 | Carisey | 360/96.6 |
| 4,071,860 | 1/1978 | Watanabe et al. | 360/96.5 |
| 4,257,075 | 3/1981 | Wysochi et al. | 360/96.5 |

FOREIGN PATENT DOCUMENTS

| 47-25364 | 7/1972 | Japan | 360/96.5 |
| 55-70956A | 5/1980 | Japan | 360/96.5 |
| 56-140547A | 11/1981 | Japan | 360/96.5 |
| 57-138069A | 9/1982 | Japan | 360/96.5 |
| 58-26361A | 2/1983 | Japan | 360/96.5 |
| 58-100263A | 6/1983 | Japan | 360/96.5 |
| 58-100262A | 6/1983 | Japan | 360/96.5 |
| 0624285 | 9/1978 | U.S.S.R. | 360/96.6 |

Primary Examiner—John H. Wolff
Assistant Examiner—Alfonso Garcia
Attorney, Agent, or Firm—Burgess, Ryan & Wayne

[57] ABSTRACT

A magnetic recording/reproducing apparatus is proposed wherein a hook arm is pivoted by a free end of one of two pivot arms when the pivot arms are urged by an inserted cassette and are pivoted by a predetermined angular interval, and the hook arm is disengaged from one of the link arms causing the cassette holders to descend when the hook arm is pivoted by a predetermined angular interval, thereby setting the cassette in the recording/play mode. The descent timing of the cassette is predetermined, and the cassette can be stably set in the correct recording/reproduction position.

14 Claims, 10 Drawing Figures

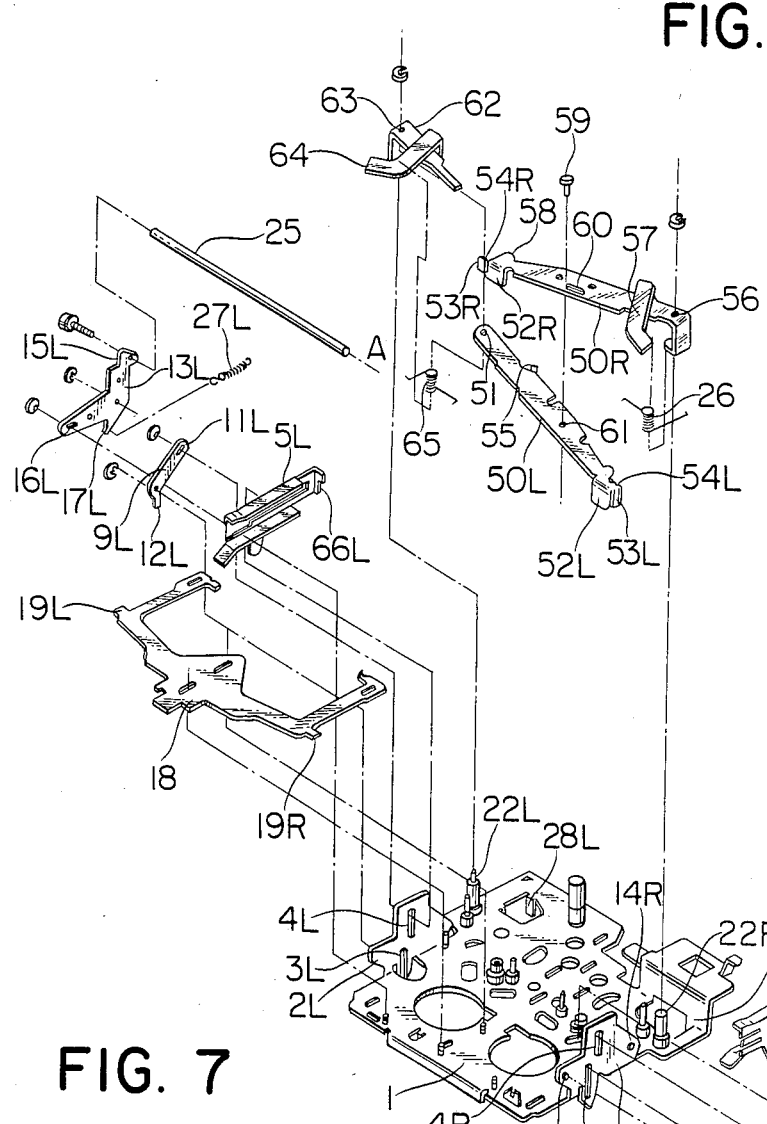
FIG. 6
FIG. 7
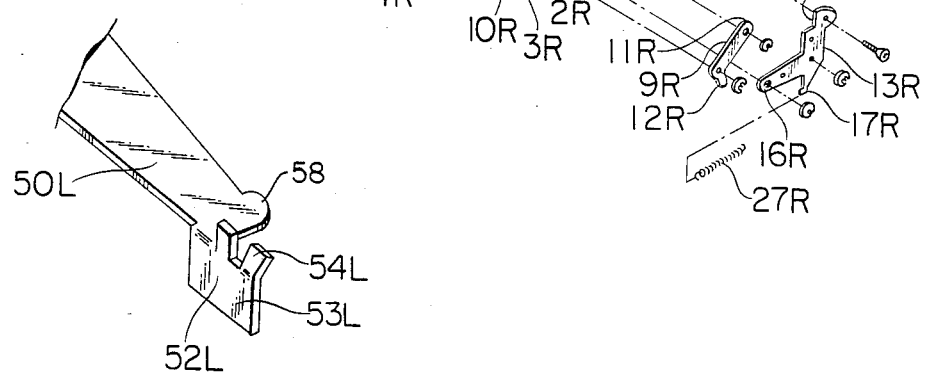

SEPARATELY PIVOTED HOOK ARM ARRANGEMENT FOR A CASSETTE LOADING AND UNLOADING DEVICE

BACKGROUND OF THE INVENTION

I. Field of the Invention

The present invention relates to a magnetic recording/reproducing apparatus using a cassette tape and, more particularly, to a magnetic recording/repro-ducing apparatus wherein a cassette tape inserted therein is moved downward at a predetermined position and set so as to perform recording or reproduction.

II. Description of the Prior Art

FIGS. 1 to 3 show a conventional magnetic recording/reproducing apparatus. Referring to FIGS. 1 to 3, reference numeral 1 denotes a chassis. Side plates 2L and 2R are integrally formed at both sides of the chassis 1. Reference numerals 3L and 4L, and 3R and 4R denote guide holes which are vertically formed in the side plates 2L and 2R, respectively, and extend in a direction perpendicular to the surface of chassis 1. Reference numerals 5L and 5R denote cassette holders for guiding and holding a cassette 6 inserted therein. Pins 7L and 8L and pins 7R and 8R formed on the cassette holders 5L and 5R are inserted in the guide holes 3L and 4L and 3R and 4R, respectively. The cassette holders 5L and 5R are respectively guided by the guide holes 3L and 4L, and 3R and 4R, so as to be vertically moved. Reference numerals 9L and 9R denote arms which are supported to be pivotal about pins 10L and 10R formed on the side plates 2L and 2R, respectively. An elongated hole 11L is formed at one end of the arm 9L, and an elongated hole 11R is formed at one end of the arm 9R. An engaging pawl 12L is formed at the other end of the arm 9L, and an engaging pawl 12R is formed at the other end of the arm 9R. The pins 8L and 8R of the cassette holders 5L and 5R are inserted in the elongated holes 11L and 11R of the arms 9L and 9R through the guide holes 4L and 4R, respectively. Reference numerals 13L and 13R denote link arms supported to be pivotal about pins 14L and 14R formed on the side plates 2L and 2R, respectively. Notched steps 15L and 15R, elongated holes 16L and 16R, and engaging members 17L and 17R are formed on the link arms 13L and 13R, respectively. The pins 7L and 7R of the cassette holders 5L and 5R extend through the guide holes 3L and 3R of the side plates 2L and 2R and are inserted in the elongated holes 16L and 16R of the link arms 13L and 13R, respectively.

Referring to FIG. 3, reference numeral 18 denotes an eject lever. The eject lever 18 is slidably supported by pins which extend from the chassis 1. Reference numerals 19L and 19R, respectively, denote projections integrally formed with the left and right ends of the eject lever 18. Reference numerals 20L and 20R denote pivot arms, respectively. One end portion of each of the pivot arms 20L and 20R is bent in a substantially U shape. A hole 21L is formed at one end portion of the pivot arm 20L, and a hole 21R is formed at one end portion of the pivot arm 20R. Reference numerals 22L and 22R respectively denote shafts fixed on the chassis 1. The shafts 22L and 22R are inserted in the holes 21L and 21R of the pivot arms 20L and 20R. The pivot arms 20L and 20R are pivotal around the shafts 22L and 22R, respectively. Reference numerals 23L and 23R denote bent members formed at the free end portions (i.e., the other end portion) of the pivot arms 20L and 20R, respectively. Reference numerals 24L and 24R denote L-shaped engaging members integrally formed with the pivot arms 20L and 20R, respectively. Reference numeral 25 denotes a connecting rod, both ends of which are screwed to the link arms 13L and 13R. Reference numeral 26 denotes a spring mounted around the shaft 22R. One end of the spring 26 engages with the pivot arm 20R and the other end thereof engages with the upright member formed on the chassis 1. The pivot arm 20R is biased counterclockwise by the biasing force of the spring 26. Reference numerals 27L and 27R denote springs, respectively. One end of each of the springs 27L and 27R engages with a corresponding one of the engaging members 17L and 17R of the link arms 13L and 13R, and the other end thereof engages with a corresponding one of engaging members 28L and 28R of the chassis 1. The link arms 13L and 13R are biased counterclockwise by the springs 27L and 27R, respectively. Reference numeral 29 denotes an elongated hole formed in the pivot arm 20L; and 30, a pin. The pin 30 extends through the elongated hole 29 and is forcibly inserted in a hole 31 of the pivot arm 20R.

Referring to FIGS. 1 and 2, reference numeral 40 denotes an operation button fixed on the eject lever 18. One end of each of springs 41L and 41R engages with the eject lever 18, and the other end thereof engages with the chassis 1. The eject lever 18 is biased by the springs 41L and 41R in the forward direction. Reference numerals 42L and 42R denote fast forward (FF) and rewind (REW) levers, respectively. The FF and REW levers 42L and 42R are biased by springs in the forward direction. Reference numerals 43L and 43R denote operation buttons fixed to the FF and REW levers 42L and 42R, respectively. Reference numeral 44 denotes a lock lever which is slidable to the right and left. When an operator depresses the operation button 43L or 43R coupled to the FF lever 42L or the REW lever 42R, respectively, the lever 42L or 42R is locked in the depressed state by the lock lever 44. The lever 42L or 42R is released from the locked state when the operator depresses the operation button 40 coupled to the eject lever 18. Reference numerals 45L and 45R denote reel shafts which are driven by a motor 46; 47L and 47R, capstan shafts; and 48L and 48R, pinch rollers, respectively. Reference numeral 49 denotes a magnetic head.

The operation of the conventional magnetic recording/reproducing apparatus having the construction described above will now be described. FIG. 1 shows a state wherein the cassette 6 is ejected. In this condition, the cassette holders 5L and 5R are respectively held at the upper positions. The engaging members 24L and 24R of the pivot arms 20L and 20R engage with the notched steps 15L and 15R of the link arms 13L and 13R, respectively.

When the operator inserts the cassette 6 into the cassette holders 5L and 5R, the cassette 6 is guided along the cassette holders 5L and 5R as it is pushed backward. When the operator inserts the cassette 6 further into the cassette holders 5L and 5R, the cassette 6 abuts against the bent members 23L and 23R of the pivot arms 20L and 20R, so that the pivot arms 20L and 20R pivot about the shafts 22L and 22R, respectively. At the same time, the engaging members 24L and 24R pivot upon movement of the pivot arms 20L and 20R, respectively. When the operator further inserts the cassette 6 to pivot the pivot arms 20L and 20R, the engaging members 24L and 24R of the pivot arms 20L and 20R are respectively disengaged from the link arms 13L and 13R, so that the link arms 13L and 13R are pivoted counterclockwise by the biasing forces of the springs 27L and 27R. Since the pins 7L and 7R of the cassette holders 5L and 5R engage with the elongated holes 16L and 16R of the link arms 13L and 13R, respectively, the cassette holders 5L and 5R are guided downward through the guide holes 3L and 4L and 3R and 4R upon movement of the link arms 13L and 13R. As the cassette holders 5L and 5R are moved downward, the cassette 6 inserted therein is also moved downward. The reels (not shown) of the cassette 6 engage with the reel shafts 45L and 45R, respectively. The reels are rotated, so that the magnetic recording/reproducing apparatus is set in the recording or reproduction (play) mode, as shown in FIG. 2. In this mode, the distal ends of the engaging members 24L and 24R of the pivot arms 20L and 20R abut against the inner surfaces of the link arms 13L and 13R, respectively, so that the pivotal movement of the pivot arms 20L and 20R caused by the spring 26 is interrupted.

In the state shown in FIG. 2, when the operator depresses the operation button 40 to move the eject lever 18 backward, the projections 19L and 19R of the eject lever 18 abut against the engaging pawls 12L and 12R of the arms 9L and 9R, respectively, so as to pivot the arms 9L and 9R. Since the pins 8L and 8R of the cassette holders 5L and 5R engage with the elongated holes 11L and 11R of the arms 9L and 9R, respectively, the cassette holders 5L and 5R are moved upward upon pivotal movement of the arms 9L and 9R. In addition, upon this upward movement of the cassette holders 5L and 5R, the link arms 13L and 13R are pivoted. When the link arms 13L and 13R are thus pivoted, the engaging members 24L and 24R of the pivot arms 20L and 20R are separated from the inner surfaces of the link arms 13L and 13R. The pivotal movement of the pivot arms 20L and 20R which was interrupted by the link arms 13L and 13R is now restarted by the biasing force of the spring 26. The engaging members 24L and 24R are brought into engagement with the notched steps 15L and 15R of the link arms 13L and 13R. When the pivot arms 20L and 20R are pivoted, the cassette 6 is urged forward by the bent members 23L and 23R of the pivot arms 20L and 20R, so that the cassette 6 is ejected.

However, in the conventional magnetic recording/reproducing apparatus described above, the cassette 6 is inserted in the cassette holders 5L and 5R and the pivot arms 20L and 20R are pivoted to disengage the engaging members 24L and 24R if the pivot arms 20L and 20R from the notched steps 15L and 15R of the link arms 13L and 13R, so that the cassette 6 is lowered. In this case, the descent timing varies in accordance with dimensional variations and manufacturing errors in the pivot arms 20L and 20R and the link arms 13L and 13R, resulting in inconvenience. In other words, in the conventional apparatus described above, the cassette 6 urges the bent members 23L and 23R of the pivot arms 20L and 20R so as to pivot the pivot arms 20L and 20R. A ratio of a distance between the center of rotation of each of the pivot arms 20L and 20R and a corresponding one of the bent members 23L and 23R to a distance between the center of rotation and the distal end of each of the engaging members 24L and 24R is increased, and the motion of the engaging members 24L and 24R is reduced to a fraction of that of the bent members 23L and 23R when the cassette 6 urges the bent members 23L and 23R to pivot the pivot arms 20L and 20R. For example, when the bent members 23L and 23R are respectively moved by 1 cm, the distal ends of the engaging members 24L and 24R are respectively moved by only 0.2 to 0.3 cm. Since it is this slight movement of the engaging members 24L and 24R and the link arms 13L and 13R which determines the descent timing of the cassette 6, the timing can vary in accordance with any dimensional variations and manufacturing errors in the engaging members 24L and 24R and the link arms 13L and 13R. When the actual cassette descent timing deviates from the correct timing, the cassette 6 catches against the capstan shafts 47L and 47R, the reel shafts 45L and 45R and the like, and cannot be set in the correct position.

In the conventional magnetic recording/reproducing apparatus described above, when the cassette 6 is inserted and lowered (the state shown in FIG. 2), the distal ends of the engaging members 24L and 24R of the pivot arms 20L and 20R respectively abut against the inner surfaces of the link arms 13L and 13R to prevent the pivotal movement of the pivot arms 20L and 20R which is caused by the biasing force of the spring 26. Thus, the stop positions of the pivot arms 20L and 20R fall within a wide range in accordance with the dimensional variations and manufacturing errors in the pivot arms 20L and 20R and the link arms 13L and 13R. For example, even if the position of the distal end of each of the engaging members 24L and 24R varies within a range of only 0.1 cm, the position of the corresponding bent member 24L or 24R may vary within the wide range of 2 to 3 cm. In addition to this disadvantage, the biasing force of the spring 26 always acts on the cassette 6 through the pivot arms 20L and 20R, so that the loading of the cassette 6 becomes unstable. In order to prevent this, the pivot arms 20L and 20R and the link arms 13L and 13R must be adjusted so that the stop positions correspond to the predetermined positions.

SUMMARY OF THE INVENTION

It is a first object of the present invention to provide a magnetic recording/reproducing apparatus capable of moving an inserted cassette downward and accurately setting the cassette at a predetermined recording/reproducing position.

It is a second object of the present invention to stably hold the cassette in the recording/reproducing position.

It is a third object of the present invention to provide a magnetic recording/reproducing apparatus with a simplified mechanism.

In order to achieve the above objects, the inserted cassette causes pivot arms to pivot, so that a hook arm is pivoted by the free end of the corresponding pivot arm, thereby disengaging the hook arm from the corresponding link arm and hence lowering the cassette holders.

The present invention has an advantage in that the hook arm is pivoted by the motion of the free end of the corresponding pivot arm without reducing the motion thereof, so that the descent timing of the cassette holders and hence the cassette will not vary in accordance with dimensional variations and manufacturing errors in the hook arms and the link arms. For this reason, the cassette will not catch against the capstan shafts, the reel shafts and the like, and can be smoothly set in the recording/reproducing position.

The present invention has another advantage in that the stop positions of the pivot arms are set at the predetermined positions since the pivotal movement of the pivot arms upon downward movement of the cassette is caused by the descending cassette itself, so that the stop positions need not be adjusted.

The present invention has still other advantages in that the cassette loading mechanism can be made thin and the descent timing of the cassette corresponds to a predetermined timing since the pivot arms are pivoted parallel to the chassis, the hook arm is pivotally supported by a shaft for supporting the corresponding pivot arm, and the hook arm is pivoted by means of the free end of the corresponding pivot arm, and in that the loading mechanism can be simplified since the hook arms are returned to the initial positions by utilizing the pivotal movement of the pivot arms.

BRIEF DESCRIPTION OF THE DRAWINGS

FIG. 6 is an exploded perspective view showing the main part of the apparatus shown in FIG. 4;

FIG. 7 is a perspective view showing the main part of the pivot arms of the apparatus shown in FIG. 4;

Figure 1:
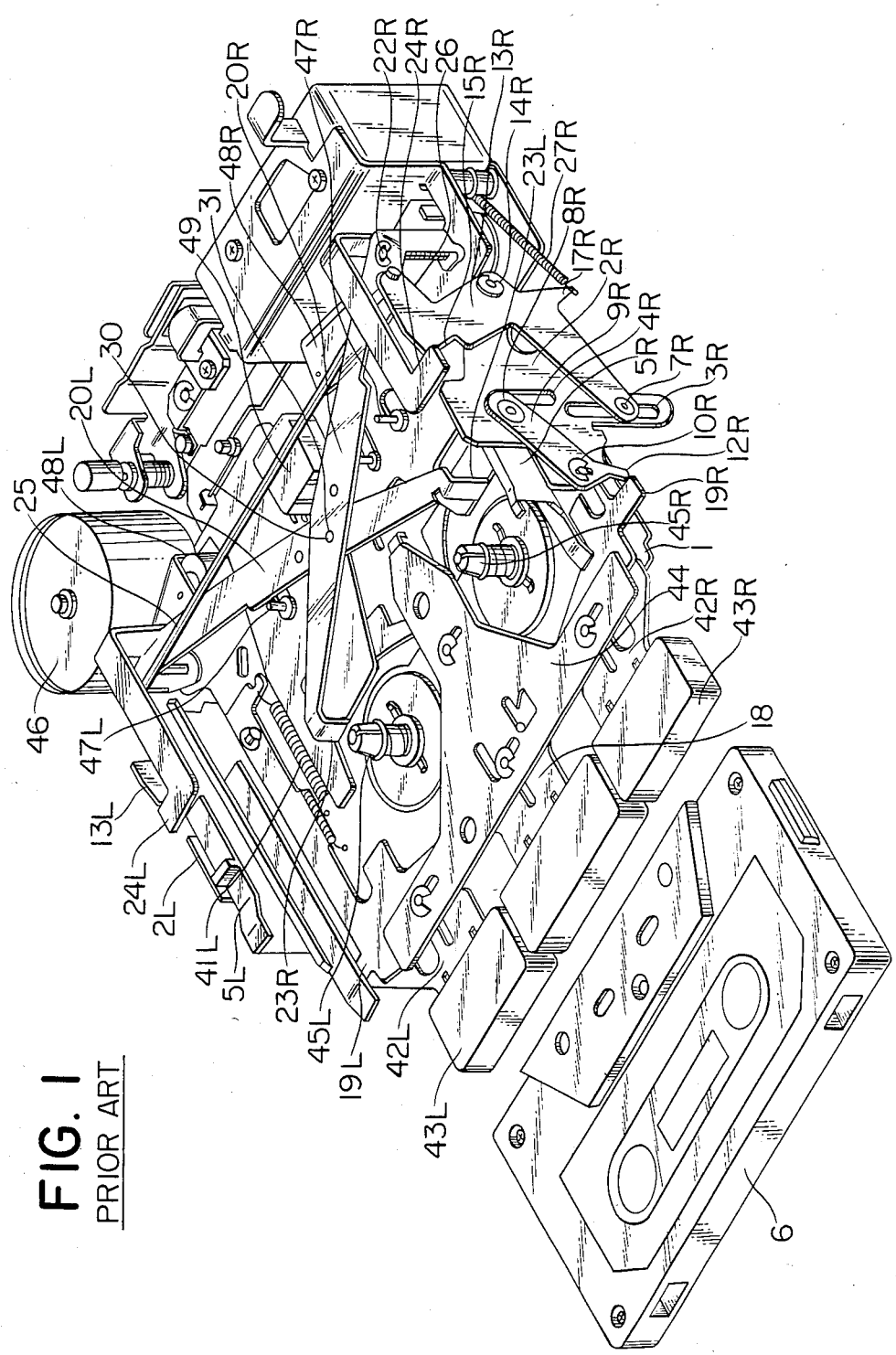
FIG. 1 is a perspective view of a conventional recording/reproducing apparatus in the eject mode.
Figure 2:
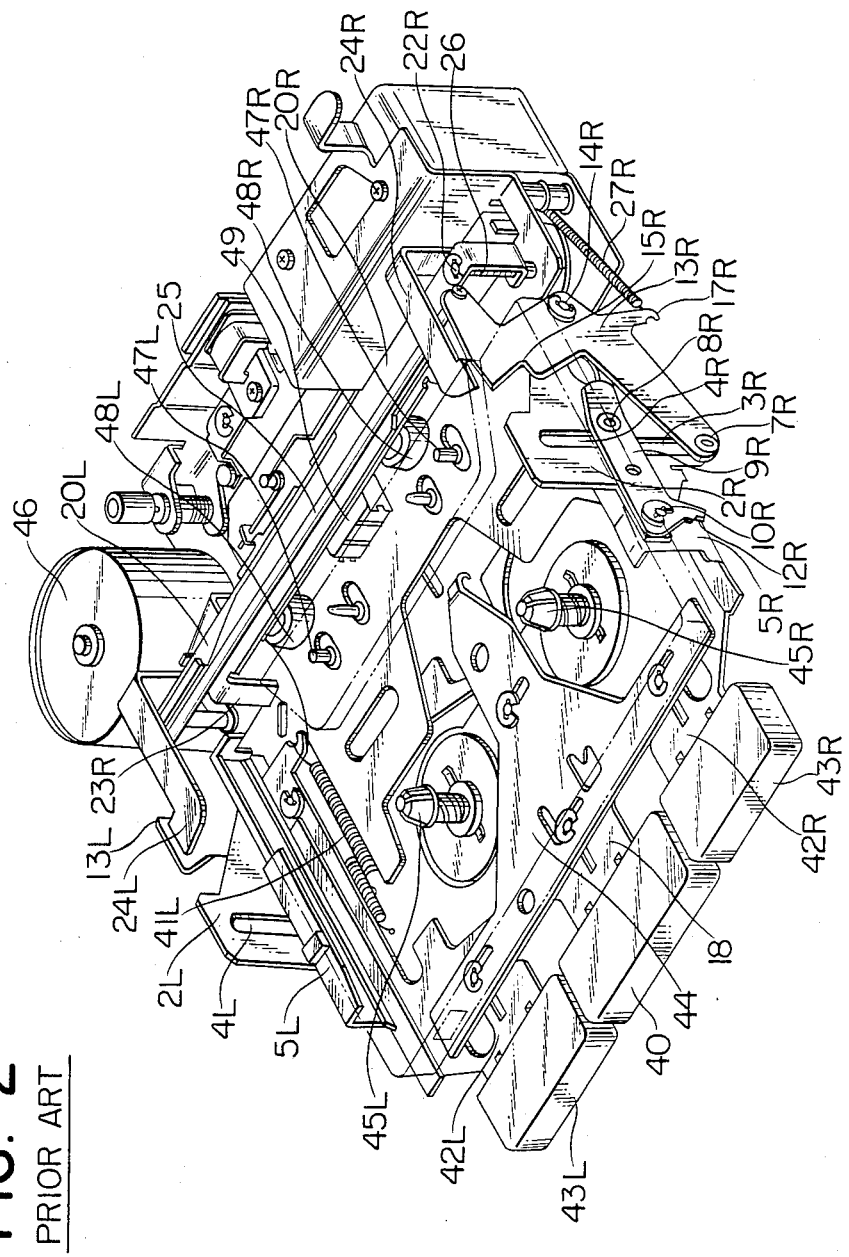
FIG. 2 is a perspective view of the apparatus shown in FIG. 1 in the recording/play mode.
Figure 3:
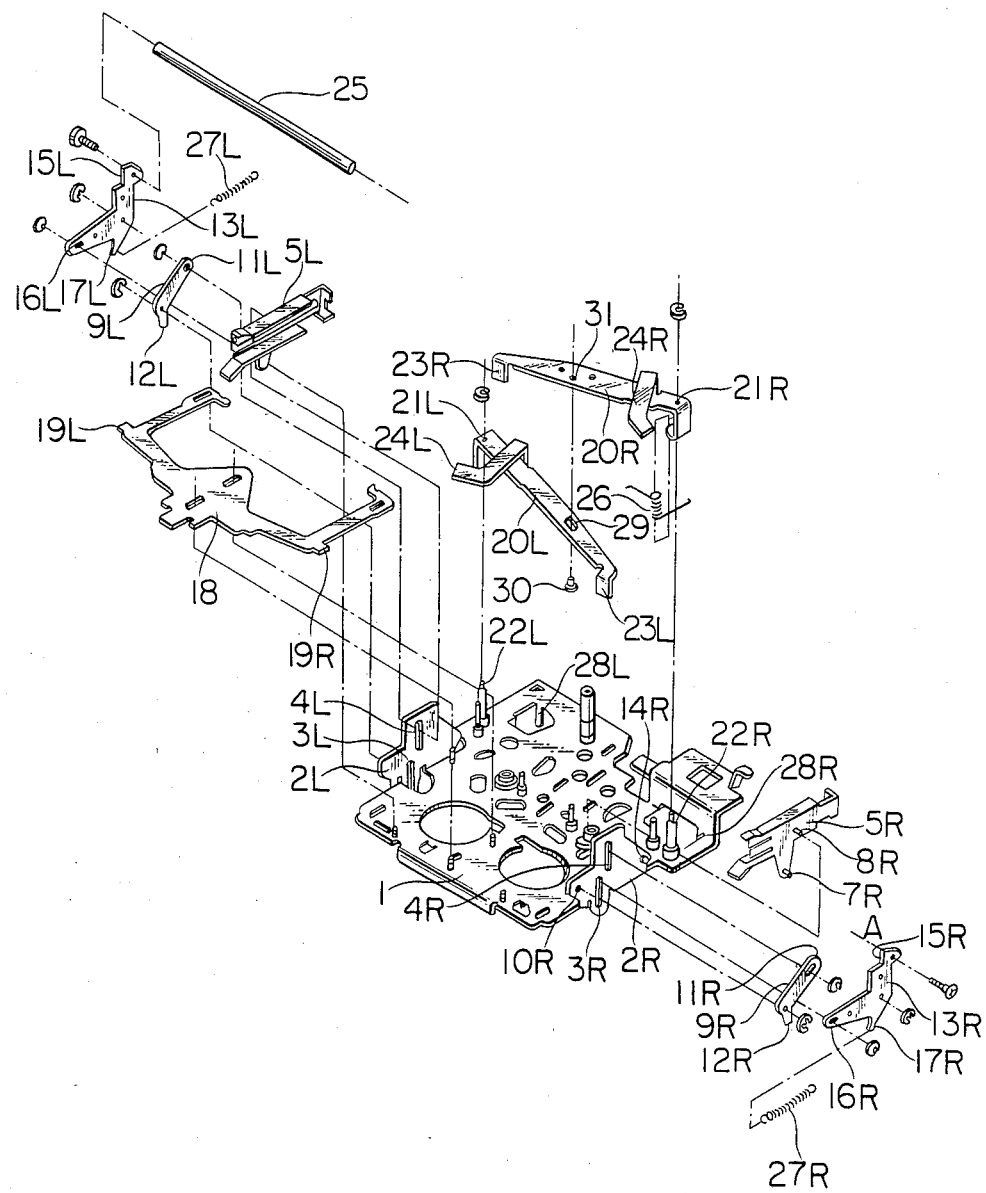
FIG. 3 is an exploded perspective view showing the main part of the apparatus shown in FIG. 1.
Figure 4:
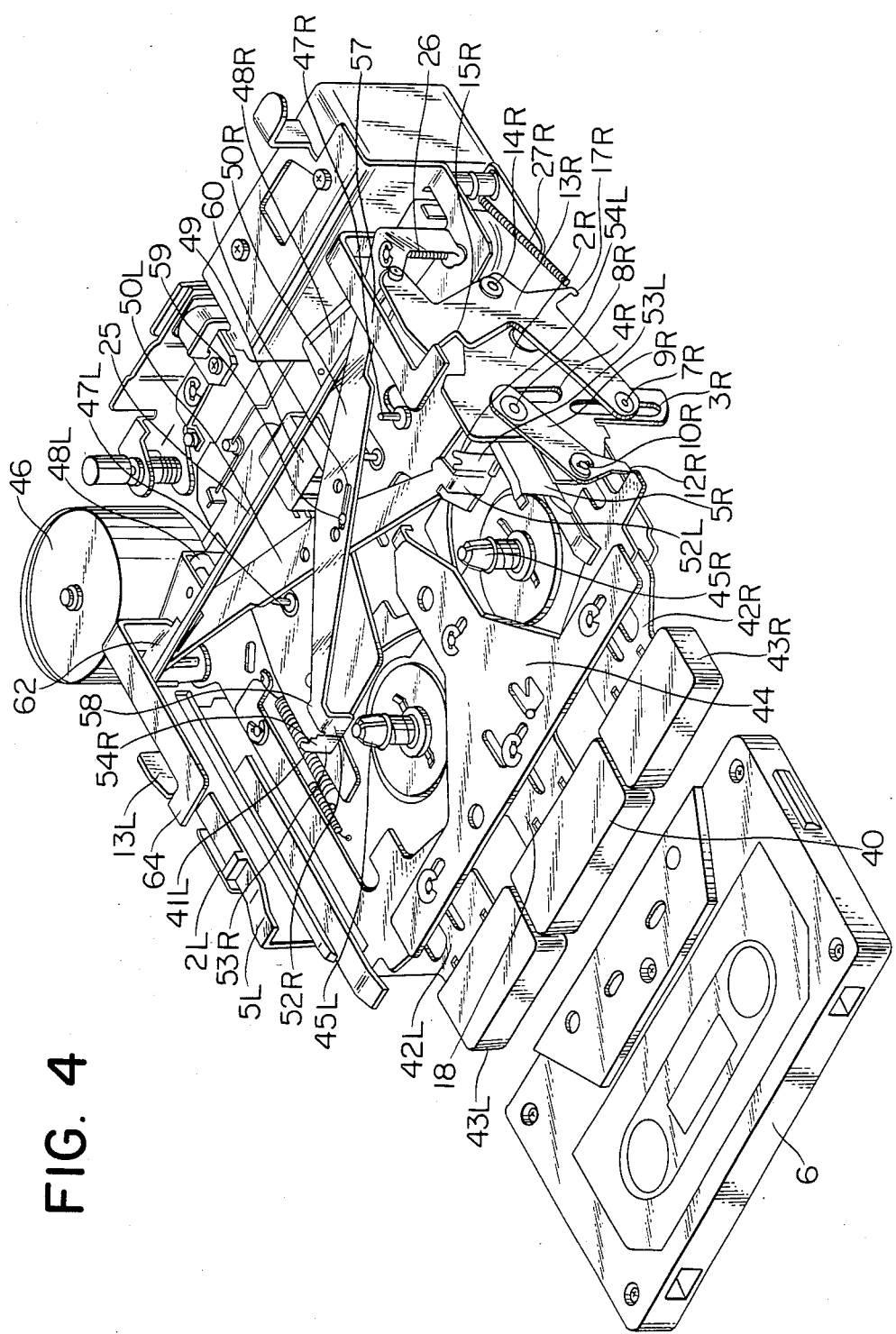
FIG. 4 is a perspective view of a recording/reproducing apparatus according to an embodiment of the present invention in the eject mode.
Figure 5:
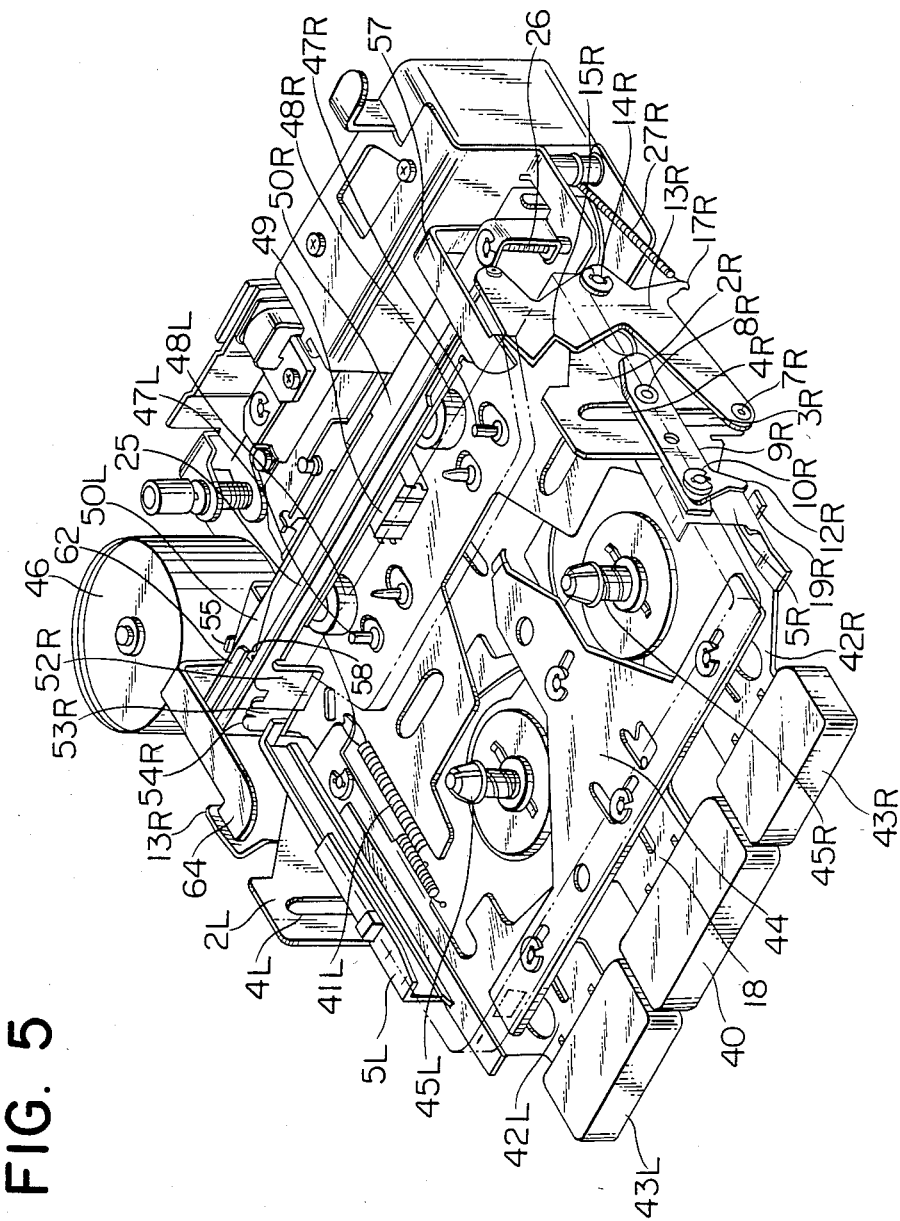
FIG. 5 is a perspective view of the apparatus shown in FIG. 4 in the recording/play mode.
Figure 8:
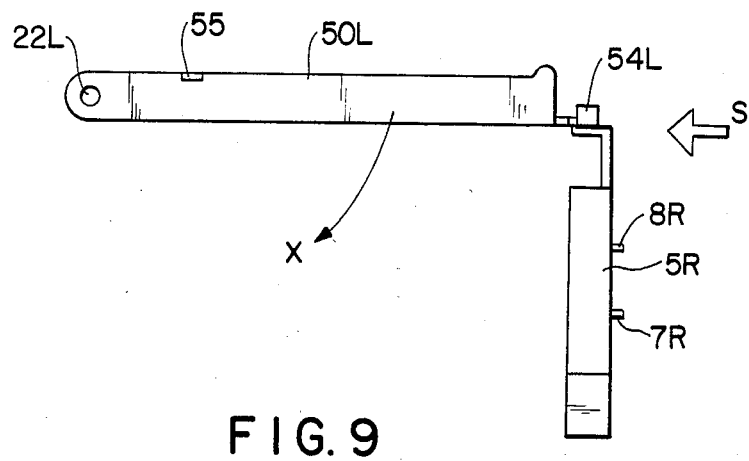
FIG. 8 is a top plan view of a portion of the device of FIG. 5, showing an inclined member being arranged to urge a cassette holder upward in an eject mode.
Figure 9:
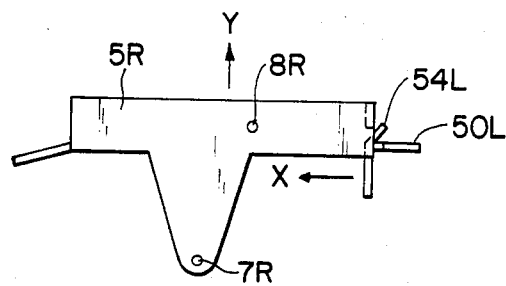
FIG. 9 is a side elevational view of the portion of the device of FIG. 8, viewed from arrow S.
Figure 10:
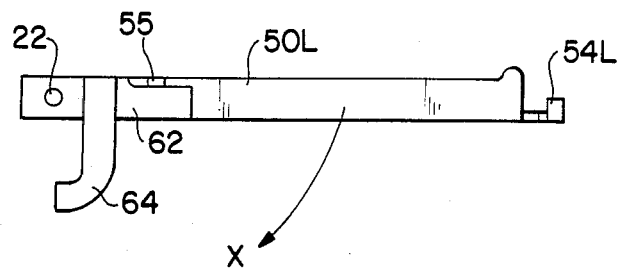
FIG. 10 is a top plan view of a portion of the device of FIG. 5, showing an upright member formed on a pivot arm being arranged too pivot a hook arm in an eject mode.

DETAILED DESCRIPTION OF THE PREFERRED EMBODIMENT:

FIGS. 4 to 6 show a magnetic recording/reproducing apparatus according to an embodiment of the present invention. The same reference numerals as used in FIGS. 4 to 6 denote the same parts as in FIGS. 1 to 3.

Referring to FIGS. 4 to 6, reference numerals 50L and 50R denote pivot arms, respectively. A hole 51 is formed at one end of the pivot arm 50L, and a bent member 52L is formed at the other end thereof. The bent member 52L is brought into contact with a cassette 6. Reference numeral 53L denotes a stopper integrally formed at the outer side of the bent member 52L. An inclined member 54L is integrally formed with the upper portion of the stopper 53L. Reference numeral 55 denotes an upright member formed at the rear portion of the pivot arm 50L. The upper portion of small-diameter of a shaft 22L is fitted in the hole 51 of the pivot arm 50L so that the pivot arm 50L can be pivoted about the shaft 22L. The pivot arm 50R has substantially the same construction as that of the conventional pivot arm 20R such that the pivot arm 50R has a U-shaped portion and a hole at its end. Reference numeral 57 denotes an L-shaped engaging member integrally formed with the pivot arm 50R; 52R, a bent member formed at the free end of the pivot arm 50R; 53R, a stopper integrally formed with the bent member 52R; 54R, an inclined member integrally formed with the upper portion of the stopper 53R; and 58, a press projection formed at the free end of the pivot arm 50R. Reference numeral 59 denotes a pin which is forcibly inserted in a hole 61 of the pivot arm 50L. The pivot arm 50R is pivotally supported by a shaft 22R.

Reference numeral 62 denotes a hook arm. One end of the hook arm 62 is formed in a substantially U shape and has a hole 63 formed therein. Reference numeral 64 denotes an engaging member integrally formed with the hook arm 62. The hook arm 62 is pivotally supported by the shaft 22L. Reference numeral 65 denotes a spring mounted around the shaft 22L. One end of the spring 65 is stopped by the hook arm 62, and the other end thereof is stopped by the chassis 1. The hook arm 62 is slightly biased clockwise by the elastic force of the spring 65. In this embodiment, notches 66L and 66R are formed at the lower portions of the rear surfaces of the cassette holders 5L and 5R, respectively.

The operation of the magnetic recording/reproducing apparatus having the construction described above will now be described. FIG. 4 shows the apparatus in the eject mode. The cassette holders 5L and 5R are located at the upper positions, and the bent members 52L and 52R of the pivot arms 50L and 50R are located at the forward positions, respectively. The engaging member 64 of the hook arm 62 is engaged with the notched step 15L of the link arm 13L, and the engaging member 57 of the pivot arm 50R is engaged with the notched step 15R of the link arm 13R.

In this mode, when the operator inserts the cassette 6 into the cassette holders 5L and 5R, the cassette 6 abuts against the bent members 52L and 52R of the pivot arms 50L and 50R, so that the pivot arms 50L and 50R are pivoted. Upon pivotal movement of the pivot arm 50R, the engaging member 57 thereof is also pivoted. When the cassette 6 is inserted further, the press projection 58 of the pivot arm 50R abuts against and pivots the hook arm 62. When the cassette 6 is inserted still further, the engaging member 57 is disengaged from the link arm 13R. It should be noted that the engaging member 64 of the hook arm 62 will not be disengaged from the the link arm 13L even if the engaging member 57 is disengaged from the link arm 13R. When the cassette 6 is inserted still further to pivot the hook arm 62, the engaging member 64 of the hook arm 62 is disengaged from the link arm 13L. Then, the link arms 13L and 13R are pivoted by the biasing forces of the springs 27L and 27R to move the cassette holders 5L and 5R downward, respectively.

FIG. 5 shows the apparatus in the recording/play mode wherein the cassette holders 5L and 5R have been moved downward. In this mode, the stoppers 53L and 53R of the pivot arms 50L and 50R abut against the rear surfaces of the lowered cassette holders 5L and 5R, respectively. As a result, the pivotal movement of the pivot arms 50L and 50R by the spring 26 is prevented.

The eject operation of the cassette 6 in the mode shown in FIG. 5 will now be described.

Referring to FIG. 5, when the operator depresses the operation button 40 to move the eject lever 18, the projections 19L and 19R of the eject lever 18 abut against the engaging pawls 12L and 12R of the arms 9L and 9R. Upon pivotal movement of the arms 9L and 9R, the cassette holders 5L and 5R are moved upward, and the link arms 13L and 13R are also pivoted. When the cassette holders 5L and 5R are moved further upward, and the link arms 13L and 13R are further pivoted, the pivot arms 50L and 50R are released from the cassette holders 5L and 5R, so that the pivot arms 50L and 50R are pivoted by the biasing force of the spring 26. The engaging meber 57 of the pivot arm 50R engages with the notched step 15R of the link arm 13R. When the pivot arm 50L is pivoted, the upright member 55 of the pivot arm 50L causes the hook arm 62 to pivot, so that the engaging member 64 of the hook arm 62 engages with the notched step 15L of the link arm 13L, thereby setting the eject mode as shown in FIG. 4.

When the pivot arms 50L and 50R are released and are pivoted by the biasing force of the spring 26, the inclined members 54L and 54R of the pivot arms 50L and 50R abut against the rear parts of cassette holders 5L and 5R and urge the cassette holders 5L and 5R upward, respectively. As a result, the cassette holders 5L and 5R can be smoothly moved upward.

What is claimed is:

1. A cassette loading and unloading device for a magnetic recording/reproducing apparatus, comprising
   a frame having a forward open end and opposite sides;
   opposed cassette holders mounted on said opposite sides of said frame for vertical movement and which guide and hold a cassette, said opposed cassette holders being open at said forward end of said frame;
   first and second pivot arms pivotally mounted at opposite sides of said frame about respective first and second pivot axes and which are pivoted rearwardly away from said forward end by insertion of the cassette into said cassette holders;
   biasing means for biasing said pivot arms toward said forward end;
   first and second link arms pivotally mounted to opposite sides of said frame and pivotally actuated upon vertical movement of said cassette holders;
   a first engaging member fixedly mounted on said first pivot arm for engagement with said first link arm;
   the improvement comprising:
   a hook arm pivotally mounted on said frame about said second axis independent and separate from said second pivot arm so as to be pivotally mounted with respect to said second pivot arm;
   a second engaging member formed on said hook arm for engaging with said second link arm;
   said hook arm being engaged by a free end of said first pivot arm when the cassette is inserted into said cassette holders to pivot said hook arm so as to disengage said engaging member of said second hook arm from the second link arm;
   whereby said disengagement of the second engaging member of said hook arm from the second link arm determines the timing for movement of said cassette onto respective reel shafts of said magnetic recording/reproducing apparatus so as to achieve improved association of said engaging member of said second hook arm with said second link arm in proper timed relation, resulting in accuracy in the timing of the descent of the cassette onto the reel shafts.

2. A device according to claim 1, further comprising an upright member formed on said second pivot arm so as to pivot said hook arm in an eject mode.

3. A device according to claim 1, wherein pivotal movement of said pivot arms by said biasing means is prevented by the descent of said cassette holders when said second engaging member of said hook arm is disengaged from the first link arm.

4. A device according to claim 3, further comprising stoppers which are formed at free ends of said pivot arms and which abut against said cassette holders, respectively.

5. A device according to claim 3, further comprising stoppers and inclined members which are formed at free ends of said pivot arms, said stoppers being arranged to abut against said cassette holders, and said inclined members being arranged to urge said cassette holders upward, respectively, in the eject mode.

6. A cassette loading and unloading device for a magnetic recording/reproducing apparatus comprising first and second side plates formed at respective sides of a chassis, first and second cassette holders which are vertically movably supported by said first and second side plates, respectively, first and second link arms which are pivotally supported by said first and second side plates, respectively, and coupled to said first and second cassette holders, respectively, first biasing members for biasing said first and second link arms, respectively, first and second pivot arms which are supported by first and second shafts fixed on said chassis and which are pivotally parallel to said chassis, second biasing members for biasing said first and second pivot arms, respectively, a hook arm pivotally supported by said first shaft independent and separate from the first pivot arm whereby said hook arm is pivotally mounted with respect to said first pivot arm, a first engaging member which is fixedly formed on said second pivot arm for engaging with said second link arm, a second engaging member which is fixedly formed on said hook arm for engaging with the first link arm; and said hook arm being engaged by a free end of the second pivot arm, whereby said disengagement of the engaging member of said hook arm from the first link arm determines the timing for movement of said cassette onto respective reel shafts of said magnetic recording/reproducing apparatus so as to achieve improved association of said engaging member of said hook arm with said first link arm in proper timed relation, resulting in accuracy in the timing of the descent of the cassette onto the reel shafts.

7. A device according to claim 6, further comprising an upright member formed on the first pivot arm so as to pivot said hook arm by means of said upright member in an eject mode.

8. A device according to claim 6, wherein pivotal movement of said pivot arms by said second elastic members is prevented by the descent of said cassette holders when said second engaging member is disengaged from the first link arm.

9. A device according to claim 8, further comprising stoppers which are formed at free ends of said pivot arms and which abut against said cassette holders, respectively.

10. A device according to claim 8, further comprising stoppers and inclined members which are fomred at free ends of said pivot arms, said stoppers being arranged to abut against said cassette holders and said inclined members being arragned to urge said cassette holders upward when the eject mode is set.

11. A cassette loading and unloading device for a magnetic recording/reproducing apparatus, comprising:
   cassette holders movable in a direction perpendicular to a cassette inserting direction so as to guide and hold an inserted cassette;

first and second pivot arms, each having a first end pivotally supported about first and second pivot axes, respectively and a second end in abutting relation against the cassette inserted into said cassette holders;

a first hook arm having one end rotatably supported about said first axis independent and separate from said first pivot arm so as to be pivotally mounted with respect to said first pivot arm, and a free end thereof pushed, and thereby rotated, by the second end of said second pivot arm;

first and second link arms, said first link arm being engaged with an engaging member of the first hook arm to prevent rotation thereof and said second link arm being engaged with an engaging member of said second hook arm; and cassette holder biasing means for normally biasing said cassette holders in a first direction, pivoting said link arms in response to an ejecting operation and biasing said link arms in a second direction when said first hook arm is rotated to release the engagement between the engaging member of the first hook arm and the respective first link arm;

whereby said disengagement of the engaging member of said first hook arm from the first link arm determines the timing for movement of said cassette onto respective reel shafts of said magnetic recording/reproducing apparatus so as to achieve improved association of said engaging member of said first hook arm with said first link arm in proper timed relation, resulting in accuracy in the timing of the descent of the cassette onto the reel shafts.

12. A cassette loading and unloading device for a magnetic recording/reproducing apparatus according to claim 11; wherein stopper members abutting against rear portions of said cassette holders and inhibiting pivoting of the pivot arms when the cassette holders are moved in the first direction, are arranged at the second ends of the first and second pivot arms.

13. A cassette loading and unloading device for a magnetic recording/reproducing apparatus according to claim 12; wherein inclined members for pushing the cassette holders in the second direction during an ejecting operation, are arranged at the second ends of the first and second pivot arms.

14. A cassette loading and unloading device for a magnetic recording/reproducing apparatus according to claim 11; wherein an upright member for pushing the free end of the first hook arm to cause the latter to rotate when the first pivot arm is rotated during an ejection operation, is arranged on the first pivot arm.

* * * * *